United States Patent [19]

Tijerina-Ramos

[11] Patent Number: 5,685,888
[45] Date of Patent: Nov. 11, 1997

[54] MACHINE FOR THE PRODUCTION OF GLASSWARE ARTICLES BY THE PRESS AND BLOW PROCESS

[75] Inventor: Victor Tijerina-Ramos, Monterrey, Mexico

[73] Assignee: Vitro Crisa Cristaleria, S.A. de C.V., Monterrey, Mexico

[21] Appl. No.: 231,452

[22] Filed: Apr. 20, 1994

Related U.S. Application Data

[63] Continuation of Ser. No. 761,410, Sep. 17, 1991, abandoned.
[51] Int. Cl.$^6$ .................................................. C03B 9/195
[52] U.S. Cl. ..................... 65/68; 65/79; 65/223; 65/224; 65/229; 65/237; 65/264
[58] Field of Search ................... 65/230, 242, 229, 65/222, 223, 224, 237, 264, 261, 260, 68, 79

[56] References Cited

U.S. PATENT DOCUMENTS

| | | | |
|---|---|---|---|
| 996,365 | 6/1911 | Richards | 65/229 |
| 1,292,243 | 1/1919 | Brown | 65/229 |
| 2,036,333 | 4/1936 | Howard | 65/230 |
| 2,290,129 | 7/1942 | Moreland | 65/229 |
| 2,984,047 | 5/1961 | Mennitt | 65/229 |
| 3,291,588 | 12/1966 | Lippmann | 65/223 |
| 3,434,820 | 3/1969 | Zappia | 65/242 |
| 3,834,884 | 9/1974 | Kurokawa | 65/261 |
| 4,062,668 | 12/1977 | Zappia | 65/273 |
| 4,416,681 | 11/1983 | Dahms | 65/264 |

*Primary Examiner*—Steven P. Griffin
*Attorney, Agent, or Firm*—Abelman, Frayne & Schwab

[57] ABSTRACT

A machine for the production of glassware articles by pressing and blowing molten glass gobs fed from a glass gob feeder, comprises at least a blank mold and a corresponding pressing plunger, mounted at a stationary parison forming station, and four forming stations mounted around a 90° indexed rotary carrier, each comprising a blow head, a neck ring and a blow mold, so as to rotate to a first forming position coinciding with the parison forming station, and to second, third and fourth forming positions spaced 90° from each other, for reheating, blowing, and take out operations.

13 Claims, 2 Drawing Sheets

MACHINE FOR THE PRODUCTION OF GLASSWARE ARTICLES BY THE PRESS AND BLOW PROCESS

This application is a continuation of application Ser. No 07/761,410, filed Sep. 17, 1991, now abandoned.

FIELD OF THE INVENTION

The present invention relates to glassware article forming machines, and more specifically to indexed rotary type, press-and-blow forming machines and a new method for the production of glass bottles, jars, tumblers, chimneys and seamless glassware articles.

DESCRIPTION OF THE PRIOR ART

Machines are known for the production of glassware articles by processes known as "blow-and-blow" or "press-and-blow."

Glass bottles are commonly produced by the blow-and-blow process in a known I.S. forming machine, while jars tumblers, chimneys and similar glassware articles are normally produced by the press-and-blow process, either in known "hot molds" for seamed glassware articles, or, in "paste molds" for seamless glassware articles, and either in stationary type machines or in rotary type machines.

Stationary press-and-blow forming machines are represented by one known as an E-Machine, disclosed in U.S. Pat. No. 3,142,552 to Martin. Usually, six stationary individual sections are disposed in a semicircular array, each section having a neck ring and a blank mold which receives a glass gob from a feeder through a stationary channel. Afterwards, the glass gob is pressed in said blank mold by a pressing plunger, filing both the neck ring and the blank mold, and forming a parison. Then, after the blank mold and pressing plunger are respectively withdrawn, the naked parison is retained supported by the neck ring, and is allowed to elongate under the action of gravity, and, by the reheating effect of the internal heat of the glass. A blow mold is then closed around said parison and a blow head is placed thereon to form the parison into the final article, which is then taken out of the machine.

Such machines are commonly used for the production of articles of intermediate quality. Because of the machines particular geometry, long channels are required for feeding the respective stationary sections. This affects the thermal and physical conditions of the gob, due to scratching, deformation and cooling the gob, all which conditions affect the final quality of the finished article.

While relatively high production can be obtained using such machines having a multiplicity of sections, those machines are limited to intermediate production runs. This is due to the cost of the individual sections, and the necessity of having a plurality of operators available to take the finished glassware articles out of the machine, for final finishing.

The press-and-blow process in rotary machines, comprises the feeding of a molten glass gob through a neck ring, and into blank mold, usually through a short feeding channel. The gob is then pressed in said blank mold by a pressing plunger, to form a parison. The parison is retained by the neck ring to allow elongation of the parison by gravity, and, by the reheating effect of the hot glass. The neck ring normally is travelling on an indexed rotary carrier mounted on a vertical rotary shaft having a plurality of stations corresponding in number to the required number of blowing, take out, and mold cooling operations. The parisons are transported the successive forming positions by rotating the carrier with the parisons hanging from the neck rings. A partible blow mold, either stationary or travelling with the carrier, is then closed around the parison, and, a blow head is positioned on the blow mold, to blow the corresponding parison into the finished form of the article, at one or more blowing stations. The finished article is then released at a take out station by opening the blow mold and the neck ring and withdrawing the blow head.

In these rotary machines, the parison formation (one or more parisons in single or multiple cavity) is usually carried out the same station as the charging station.

The differences in geometry of the several types of rotary machines are dictated by the charging step, the pressing step, the reheating step for parison elongation, and, the blowing step. The corresponding time parameters can be handled in different ways and by the different types of machines, to produce:

1. High quality articles at low a velocity of production, which economically allows short runs of production, and at low cost of tooling. Such a machine is disclosed in U.S. Pat. No. 4,200,449 to Martin, known as "System 7". That machine has a stationary pressing station including a pressing plunger and a blank mold (single or double cavity), and two forming stations spaced 180° apart from each other, each comprising a neck ring, blow mold, and a blow head, travelling with a 180° bidirectionally indexed rotary carrier. This machine produces high quality articles because of the minor manipulation of the glass gob through a short channel, and, its consequent fast charging. Notwithstanding the low velocity of production. This machine can produce a wide variety of articles, in short rum, and at a low cost of tooling.

2. Intermediate quality, velocity and runs of production, at an intermediate cost of tooling, can be effected the machines disclosed in U.S. Pat. Nos. 4,062,668, 4,063,918, 4,152,132 and 4,152,133 of Zapia. Those machines have a stationary pressing station, and three stationary forming stations spaced 90° apart from each other, each including a stationary blow mold. The neck rings and the blow heads travel on a 90° indexed rotary carrier. These machines produce only an intermediate quality of finished articles because, notwithstanding the fast and minor manipulation of the glass gob and the immediate pressing thereof, the reheating step and the necessary transportation of the naked parison to a stationary blow mold, can cause parison deformation due to an excessive manipulation of the parison. The parison is then subject to being pinched by the mold, with a consequent reduction in quality of the finished articles. Because it has to have several types of tooling such as blank molds, intermediate blank molds and blow molds, the machine is of intermediate cost.

3. Intermediate quality, high velocity of production, and long runs at a high cost of tooling, can be effected by the machine disclosed in U.S. Pat. No. 1,979,211 to Rowe, known as Hartford H-28. That machine has from 12 to 18 pressing plungers, blank molds, neck rings, blow molds and blow heads, which travel on a continuous rotary carrier. In order to increase the velocity of production, while maintaining the intermediate quality, the only alternative to this machine is to provide a plurality of self-contained tooling stations which, while the charging, pressing, reheating and blowing steps are carried out, are travelling on a continuously rotary carrier. The consequent expensive tooling makes this value only for very long runs of production.

DESCRIPTION OF THE ADVANCE IN THE ART

On researching optimum distribution of the charging, reheating, pressing and blowing timing of the forming cycle in the "System 7" machine, applicant found that, in order to produce a very high quality of articles, at a higher velocity of production, and for short, intermediate and long runs of production at low cost of tooling, a compromise must be made between the number of stations and the performance time of the respective mechanisms.

These findings leading applicant to the conclusion that it is highly desirable:

1. To have a machine geometry that permits processing of a high velocity of gob cuts per minute, in order to maintain an optimum equilibrium between gob temperature, weight and form.

2. To effect the charging step in such a way that the glass gob falls into the blank mold, in the shortest possible time, from a very short feeding channel, and, in a centered way, in order to avoid gob deformation.

3. To effect the pressing step in the least time possible, and with proper coincidence between the blank mold and the pressing plunger, in order to provide an even distribution of the glass in the parison wall, thus avoiding "whirlwind" or "settlewave" defects therein, and avoiding excess heat loss.

4. To provide controlled reheating and elongation of the parison, so as to permit an even distribution of the heat in the parison, and, obtain an even distribution of the glass before final blowing.

5. To provide versatility in the duration of the article formation times, and better distribution of the reheating and blowing times, thus to provide for better distribution of the glass in the walls of the article, and a higher quality of the finished articles.

Applicant has found that, if the blow molds are closed around the parison immediately the blank mold and the pressing plunger have been retired, then the danger is avoided of deformation of the parison during its naked transportation to the blowing stations and consequential pinching of the parison by the blow mold.

The above advantages can be obtained;

If the blank mold and pressing plunger are mounted on vertical guide rails so that they can be lifted and lowered respectively for the pressing operation, and, the gob feeding channel then just swing into coincidence with the blank mold for the charging operation;

If more than one blowing station, preferably two, and consequently more than two forming stations are provided for the machine; and If the blow molds, with their corresponding blow heads, can travel with the neck rings on a 90° indexed rotary carrier.

Furthermore, in order to impart versatility of operation of the machine for a low velocity of production, if the blowing takes place immediately after charging and during transportation of the parison to the take out station at 90° from the charging station, then the rotation can be carried out both clockwise and counterclockwise to form an entire article in the charging and pressing station and deliver a finished article at the take out station as the second position.

These and other considerations lead applicant to conceive of a forming machine having a blank mold and a pressing plunger, mounted on vertical guide rails so that they can be lifted and lowered respectively into a centered coincidence with each other for a pressing operation, and a short gob feeding channel which swings to coincidence with the blank mold for the charging operation, all placed as a stationary parison forming station. Four forming stations are spaced 90° apart from each other, and travel in a rotary carrier mounted on a 90° indexed rotary shaft for an optimum distribution of time. Each forming station is equipped with a blow head, a neck ring and a blow mold so as to provide a first forming position coinciding with the parison forming station, and a second, third and fourth forming positions for reheating, blowing, and take out operations.

In this way, after the parison formation, the parison is retained by the neck ring, and, after a short controlled reheating time for parison elongation, a blow mold is closed around said parison and it is transported to second and third forming stations placed 90° apart from each other, wherein the parison is blown to the final form of the article, and then to a fourth station at the finished article is removed from the machine.

A suitable process for the production of glassware articles by using the above described machine, may comprise feeding a molten glass gob from a glass gob feeder to a blank mold, then pressing said molten glass gob in said blank mold by a pressing plunger to form a parison in a stationary charging and parison forming station, then retaining the parison by a neck ring travelling around on a 90° indexed rotary carrier comprising four forming stations, each having a respective neck ring, blow mold and blow head. A blow mold travelling on said rotary carrier is then closed around said parison retained by said neck ring in said parison forming station, and said parison is transported within said blow mold, to a second, third and fourth forming stations spaced 90° apart from each other, to blow said parison within said blow mold to a finished form, to take out said finished article from the blow mold, and to cool the blow mold and neck rings, thus preparing it for another cycle of formation, and, repeating the same operation at each of the other three stations of the rotary carrier.

SUMMARY OF THE INVENTION

It is an object of the invention, to provide a press-and-blow forming machine, and a method for the production of high quality glassware articles at a high velocity of production and at a low cost of tooling, for short, intermediate, or long runs of production.

It is also an object of the invention, to provide a press-and-blow forming machine, comprising at least one glass gob feeding channel, a blank mold and a pressing plunger mounted at a stationary parison forming station, and four forming stations spaced 90° apart from each other and mounted on a 90° indexed rotary carrier, each forming station respectively comprising blow heads, neck rings and blow molds travelling on said rotary carrier, so as to provide a first forming position coinciding with the parison forming station, and second, third and fourth positions for reheating, blowing, and take out operations.

It is also an object of the invention, to provide a press-and-blow forming machine, having the blank mold and pressing plunger mounted on vertical guide rails for a centered coincidence therebetween in the parison forming station, and having a short feeding channel swinging into coincidence with the blank mold for a centered glass gob feeding operation.

It is another object of the invention, to provide a press-and-blow forming machine, permitting a wide versatility of operation processes.

It is an additional object of the present invention, to provide a method for the production of high quality glassware articles, comprising the steps of forming a parison at a stationary parison forming station, blowing the parison at a first forming position coinciding with said parison forming station, and, at second third and fourth forming stations successively final blowing, take out of the blow molded article, and then cooling the mold.

Another object of the present invention, is to provide a method of the above disclosed nature, providing more than one blowing station.

These and other objects and advantages of the press-and-blow forming machine of the present invention will be apparent to those persons having ordinary skill in the art, from the following detailed description of the invention, as illustrated in the accompanying drawings.

DETAILED DESCRIPTION OF THE INVENTION

A preferred embodiment of the apparatus of the present invention, comprises: a stationary parison forming station I, including a support base B and a vertical column C supported on the base B, which supports vertical guide rails R, and a blank mold 1 and a corresponding pressing plunger 2, respectively slide mounted on the lower ends and the upper ends of the vertical guide rails R, by support members S1 and S2.

Respective fluid motors M1, M2 to impart to the supports S1, S2 respective upward and downward movements, coinciding with each other at a glass gob charging and pressing axis 0.

A molten glass gob feeder channel 3 is mounted between said blank mold 1 and said pressing plunger 2, and is vertically oscillated by a drive mechanism (not illustrated), in coincidence with operation of a glass gob feeder F and the blank mold 1 when the latter is driven to an upper position.

A molten glass gob is fed into said blank mold 1, after which the pressing plunger 2 is driven down to press said molten glass gob fed within said blank mold 1, to form a parison P.

Figure 1:
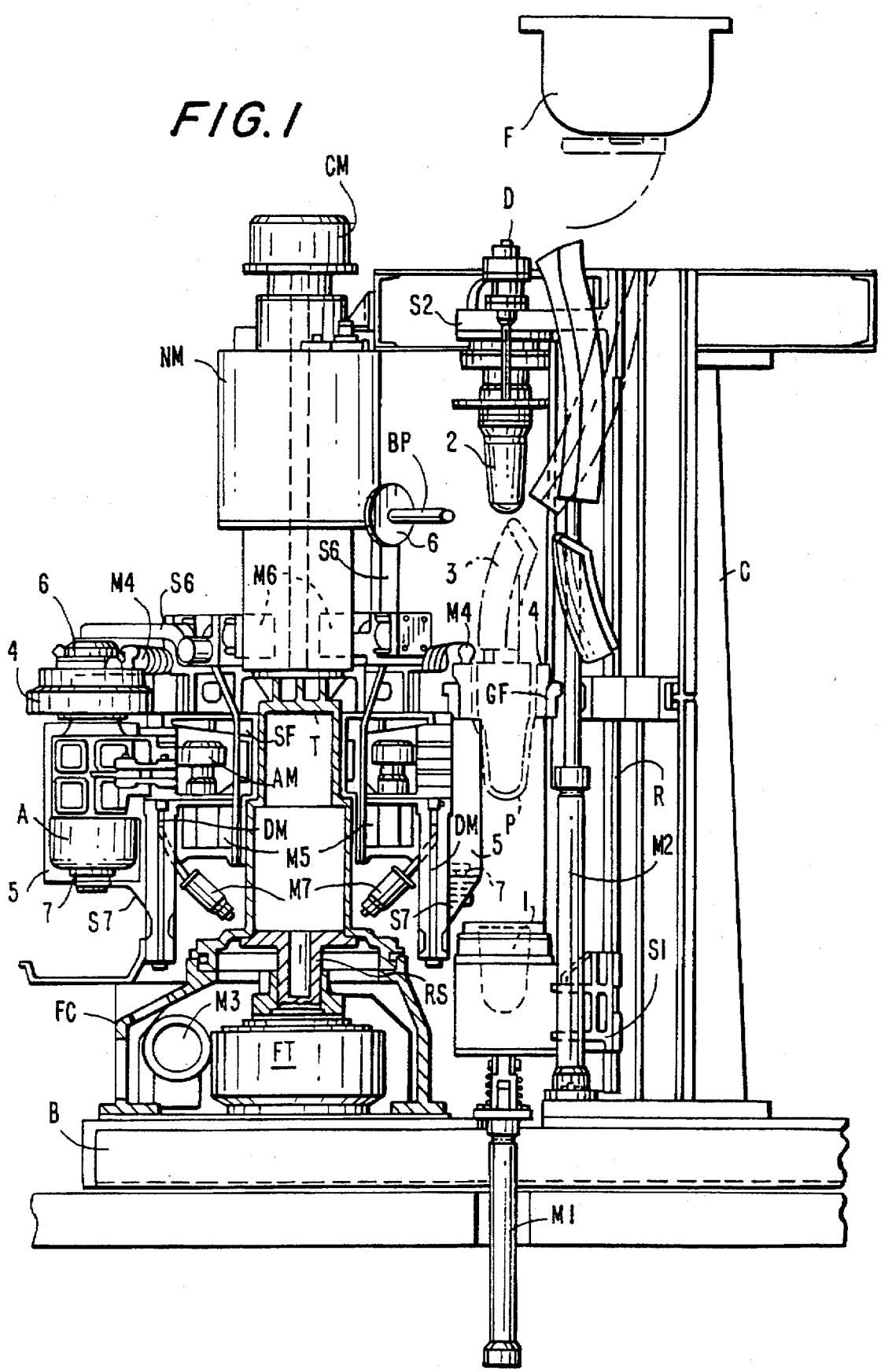
FIG. 1 is a side elevation view of the machine of the present invention for the production of glassware articles, showing only two forming stations.
Figure 2:
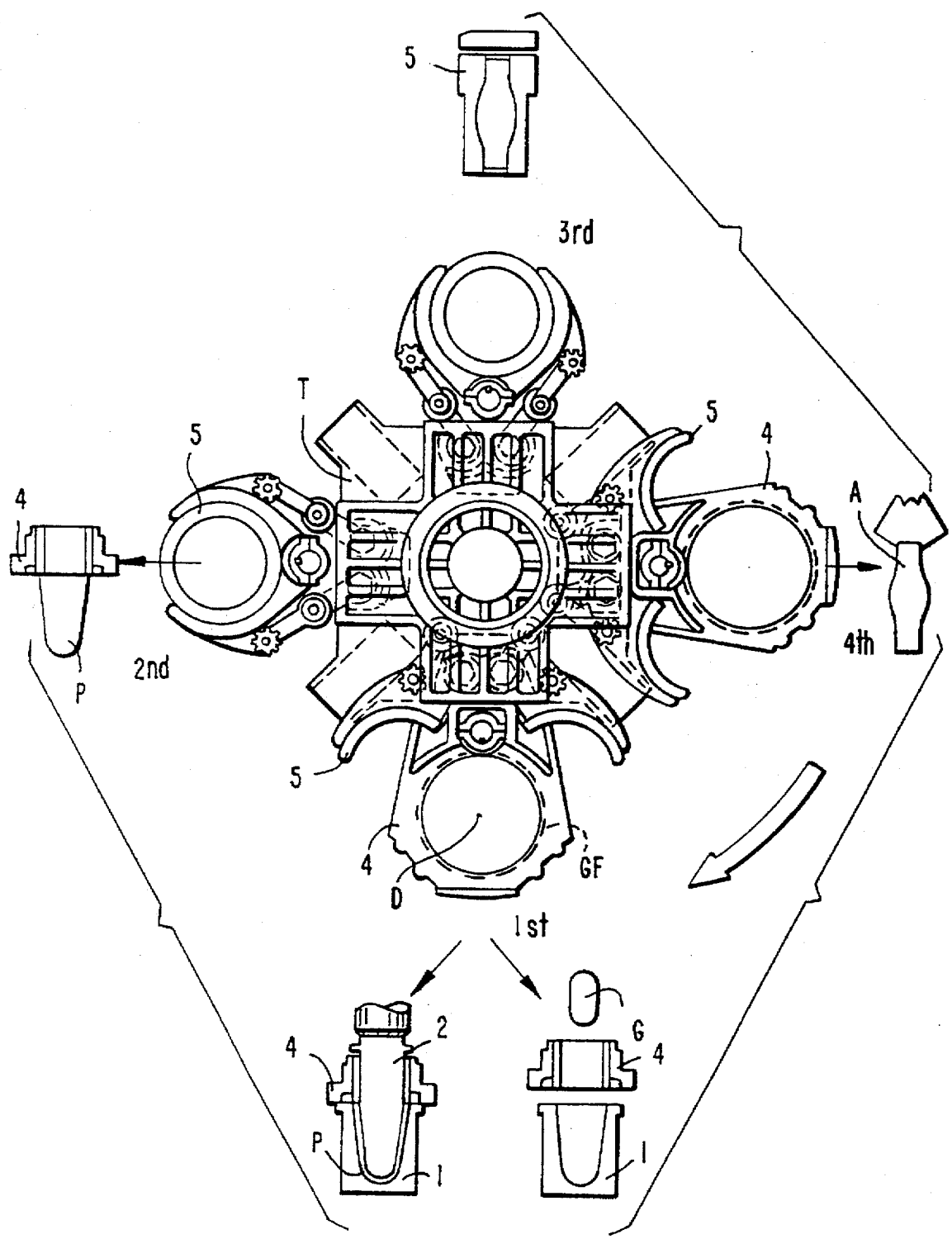
FIG. 2 is a partial schematic plan view of the machine of FIG. 1, illustrating the cycle of formation of a molded article.

A horizontal rotary table T, is supported on a casing FC supported on the support base B, the table providing first 1st, second 2nd, third 3rd and fourth 4th stations spaced 90° apart from each other (FIG. 2).

The table is centrally mounted on an indexed rotary vertical shaft RS, which extends parallel to the pressing axis 0 of the stationary parson forming station I, and which is driven by a motor M3 coupled to a transmission FT for imparting to the table an indexed clockwise or counterclockwise 90° rotary movement.

The table T is thus moved from a first forming position I coinciding with said stationary parison forming station, to second II, third III and fourth IV forming positions, providing for article finishing, take out of the molded article, and mold cooling operations.

Each of said first, second, third and fourth stations of said rotary table T comprises a neck ring 4 supported on said rotary table T, the neck ring having parison gripping fingers GF to hold the parison once it is formed, and, to release it once an article A is finished.

A partible blow mold 5 is held by an opening and closing mechanism AM, driven by a motor MS, both supported by a frame SF coupled to said rotary table T. The mechanism AM is operative to close said blow mold 5 around a recently formed parison P under said neck ring 4, and, then open it to release the article once it is finally blown to a finished form.

A blow head 6 having a blow pipe BP, is supported by a support arm S6, coupled to a cylinder M6 retained on the table T. The cylinder M6 is operative to lift and lower said blow head 6 in relationship to the neck ring 4, to provide for blowing of the parison P, to form a finished article A, in one or more of said forming stations, preferable at said first, second and third forming positions, and then release the article at the take out position IV.

A bottom plate 7 is retained by a support arm S7 coupled to an oscillating mechanism OM supported by the support frame SF of said table T. The mechanism OM is driven by a motor M7 for lifting the bottom plate up to the bottom of said blow mold 5, to form the bottom of the article, and then lower said bottom plate 7 once the finished article A reaches take out position IV.

Cooling means (not shown) to provide cooling fluid to said blank mold 1, pressing plunger 2, and the feeding channel 3 in said parison forming station I, as well as to said neck ring 4, blow mold 5 and bottom plate 7, once the blow mold 5 has delivered a finished glassware article A in said take out position IV.

An electronic control EM, NM, is provided for controlling the operation of the machine, and particular the drive motors and the transmissions.

It will be understood that the blank mold 1, pressing piston 2, gob feeder channel 3, neck ring 4, blow mold 5, blow head 6 and bottom plate 7, can be multiplied for multiple cavity mold, and that the respective driving mechanisms can be designed to perform the actuation necessary for these mechanisms.

The vertical guide rails R may be a pair of guide rails, for each of said blank mold S1 and the pressing piston S2, respectively.

Control systems including digital valves and the like, can also be introduced to control the velocity profile of the pressing piston 2 and of the rotation of said rotary table T, as well as any other component which may need it.

Also, cooling and heating nozzles can be conveniently positioned for cooling and heating particular zones of the parisons and finished articles as needed.

A motor M4 can also be provided for rotating said neck ring 4, to rotate the article while hot, particularly when said blow mold 5 is of the paste mold type used for the production of seamless glassware articles.

Manifolds and conduits are provided as necessary for feeding the fluids, either pneumatic or hydraulic, employed in the forming process. Also known elements can be provided in the blowing head 6, to provide a swirl blow for blowing the article.

A new method for the production of glassware articles in accordance with the present invention, comprises a first forming step, including placing a first station of a rotary table T at a first forming position I coinciding with a parison forming station I, then closing gripping fingers GF of a neck ring 4 of said first station at said parison forming station simultaneously moving a glass gob feeding channel 3 into coincidence with a glass gob feeder F, and then feeding a glass gob G into said blank mold 1.

The glass gob feeding channel 3 is then removed, and the pressing plunger 2 is slid down into the blank mold 1, to press said glass gob G, to form a first parison P filling said blank mold 1 and neck ring 4.

The blank mold 1 is then moved downward, and the pressing plunger 2 is moved upwardly, the neck of said first parison P being gripped by the gripping fingers GF of said neck ring 4, and providing for a reheating and preliminary elongation of the parison.

A partible blow mold 5 of said first station is then closed around said parison P under said neck ring 4, and the bottom plate 7 is placed under the blow mold 5.

A puff of compressed air is then fed into said parison P at said parison forming station to initially expand the parison P within the blow mold 5.

A second forming step includes rotating the rotary table T 90°, together with said blow mold 5 to a second forming position, and then repeating the same first forming step as described above, a second station of said rotary table T now having been placed in said parison forming station. A second parison is then formed at said parison forming station, during which time finish blowing of the first parison P is computed at the second forming position II.

A third forming step includes rotating the table T and the blow mold 5 by another 90° from the second forming position II to the third forming position III. The first forming step is then repeated in the third station of said rotary table T, which now is at the parison forming station I, to form a corresponding third parison P. The second forming step is then repeated for the second station of said rotary table T which now is at the second forming position to provide for final blowing of the second parison P to finally form the article.

A fourth forming step includes rotating said rotary table T 90° to place said first station at a fourth forming position IV. The first forming step is then repeated for the fourth station of said rotary table T, which is now at the parison forming station to form a fourth parison P. The second forming step is then repeated at said third station, and the third forming step is repeated at said second station. While the blowing head 6 of said first station is lifted, the mold 5 is opened, the bottom plate 7 is lowered, and said gripping fingers GF are opened to release a recently formed article in said fourth forming position IV where the article is partially cooled.

Finally, the rotary table T is rotated 90° to place said first station 1st of said rotary table T at the parison forming station I, during which a mold cooling operation is performed on the mold 5, neck ring 4, and the bottom plate 7, in readiness to repeat another cycle of formation.

What is claimed is:

1. A machine for use in the production of articles of glassware, comprising:

a rotary carrier;

means for indexing said rotary carrier successively through a plurality of forming positions;

a corresponding plurality of carrier forming stations, each comprising a neck ring, a blow mold, and a blow head carried by said carrier, and which are successively indexed through said plurality of forming positions by said indexing means;

a first parison forming station, including a blank mold and a plunger respectively relatively movable with respect to each other in vertical alignment, and a retractable gob feeder for feeding a gob of molten glass into said blank mold, operative to form a parison within a neck ring of a carrier forming station when said neck ring is at a first position of said plurality of forming positions;

means for closing a blow mold of said carrier forming station about said parison subsequent to the formation of said parison within said neck ring, and, means for activating a blow head of said carrier forming station to intiate blowing of said parison prior to said carrier forming station reaching a second position of said plurality of forming positions;

means for actuating said blow head to effect initial blowing of said parison when said carrier forming station is at said second position of said plurality of forming positions;

means for actuating said blow head to effect final blowing of said parison when said carrier forming station is at a third position of said plurality of forming positions; and means for opening said blow mold when said carrier forming station is in a fourth position of said plurality of forming positions, to permit removal of a molded article of glassware from said blow mold.

2. The machine of claim 1, further including means for moving said gob feeder into operative position for depositing said gob of molten glass into said blank mold, and, for withdrawing said gob feeder from said blank mold prior to relative movement of said blank mold and plunger relatively towards each other in said vertical alignment.

3. The machine of claim 1, further including means for timing the indexing of said carrier in its successive indexing through said plurality of forming positions.

4. The machine of claim 1, further including a base plate and means for moving said base plate into operative association with said blow mold subsequent to the formation of said parison, and for removing said base plate from said blow mold prior to the formation of a subsequent article of glassware within said blow mold.

5. A method for the production of glassware articles, by feeding molten glass gobs in successive cycles of formation to a press-and-blow type machine, comprising:

a first forming step including, forming a first parison at a stationary parison forming station comprising a gob delivering channel, a blank mold and a pressing plunger; retaining said first parison at a first forming position coinciding with said parison forming station by a neck ring supporting said parison of a first forming station of a 90° indexed rotary carrier having a first, second, third and fourth forming stations each having a neck ring, a blow mold and a blow head;

closing said blow mold around said parison, placing said blow head on the neck ring and blow mold;

a second forming step including, rotating 90° said first station of said rotary carrier, to a second forming position, providing a first blow into said first parison, while repeating the first forming step at said parison forming station, to form a second parison;

a third forming step including, rotating 90° said first forming station to a third forming position, providing a final blow to said first parison, to form an article, while repeating said first forming step at said parison forming station for forming a third parison, and repeating the second forming step at the second forming station for blowing the second parison;

a fourth forming step including, rotating 90° said first station to a fourth forming position, removing said blow head and opening said blow mold and neck ring to release a finished article to take it out from the machine, while repeating the first forming step at said parison forming station for forming a fourth parison, repeating the second forming step for blowing the third parison, and repeating the third forming step for finally blowing the second parison;

and finally rotating 90° said first station to the first forming position while cooling said blow mold and neck ring, to repeat another cycle of formation.

6. A method as claimed in claim 5, comprising placing a bottom plate under the blow mold of each forming station of said rotary carrier, from the first forming position and removing it when it is at the fourth forming position.

7. A method as claimed in claim 5, comprising providing a puff into the parison when it is at the first forming position coinciding with said parison forming station, to initially expand the parison.

8. A method as claimed in claim 5, comprising closing the blow-mold around the parison when it is still at the parison forming station.

9. A method as claimed in claim 5, comprising closing the blow mold around the parison when it is travelling to the second forming position.

10. A method as claimed in claim 5, comprising closing the blow mold around the parison when it is at the second forming position.

11. A method as claimed in claim 5, comprising rotating the neck ring of each forming station of said rotary carrier, within the blow mold, to produce seamless glassware articles.

12. A method as claimed in claim 5, comprising partially cooling the article at the fourth forming position.

13. A method for the production of glassware articles in a press-and-blow glassware forming machine, comprising:

a first forming step including placing a first forming station of a 90° indexed rotary carrier comprising a first, second, third and fourth forming station each having at least a neck ring, a partible blow mold, a blow head and a bottom plate, at a first forming position coinciding with a stationary parison forming station including at least a gob delivering channel, a blank mold and a pressing plunger; feeding a glass gob through said channel into said blank mold and pressing said gob into said blank mold and neck ring by said pressing plunger, to form a first parison; removing said channel prior to said pressing of said gob, retaining said first parson by said neck ring, for a reheating and preliminary elongation effect;

placing the bottom plate under the blow mold and closing the partible blow mold of the first forming station of said rotary carrier, around said parison under said neck ring and placing the blow head on the neck ring and blow mold to provide a preliminary puff into said parison;

a second forming step including rotating 90° said first forming station of said rotary carrier, to a second forming position and providing a first blow to said first parison while repeating the first forming step at said parison forming station with the second forming station of said rotary carrier, to form a second parison therein;

a third forming step including rotating 90° said first forming station of said rotary carrier, from the second forming position to a third forming position and providing a final blow to said first parison to form an article, while repeating the first forming step with the third forming station of said rotary carrier, to form a third parson and repeating the second forming step with said second forming station of said rotary carrier providing a first blow to said second parison;

a fourth forming step including rotating said first forming station of said 90° rotary carrier to place said first forming station at a fourth forming position, wherein the blow head is removed and the neck ring and blow mold are opened to release a formed article to be taken out, repealing the first forming step with fourth forming station of said rotary carrier to form a fourth parison; repeating the second forming step with said third forming station of said rotary carrier; and repeating the third forming step with said second forming station of said rotary carrier; and finally rotating 90° said first forming station of said rotary carrier from said fourth forming position to place it again at the parison forming station, while cooling said blow mold and neck ring, to repeat another cycle of formation.

* * * * *